United States Patent
Smith

(10) Patent No.: US 7,491,123 B2
(45) Date of Patent: Feb. 17, 2009

(54) VIDEO GAME VOICE CHAT WITH AMPLITUDE-BASED VIRTUAL RANGING

(75) Inventor: Darren C. Smith, Sammamish, WA (US)

(73) Assignee: Nintendo Co., Ltd., Kyoto (JP)

( * ) Notice: Subject to any disclaimer, the term of this patent is extended or adjusted under 35 U.S.C. 154(b) by 1053 days.

(21) Appl. No.: 10/901,453

(22) Filed: Jul. 29, 2004

(65) Prior Publication Data

US 2006/0025216 A1     Feb. 2, 2006

(51) Int. Cl.
*A63F 13/00* (2006.01)
*A63F 13/12* (2006.01)

(52) U.S. Cl. .......................................... 463/35; 463/30
(58) Field of Classification Search ..................... 463/1, 463/30–45
See application file for complete search history.

(56) References Cited

U.S. PATENT DOCUMENTS

| | | |
|---|---|---|
| 4,445,187 A | 4/1984 | Best |
| 4,937,853 A | 6/1990 | Brule et al. |
| 5,048,831 A | 9/1991 | Sides |
| 5,051,822 A | 9/1991 | Rhoades |
| 5,149,104 A | 9/1992 | Edelstein |
| 5,161,803 A | 11/1992 | Ohara |
| 5,292,125 A | 3/1994 | Hochstein et al. |
| 5,347,306 A | 9/1994 | Nitta |
| 5,396,225 A | 3/1995 | Okada et al. |
| 5,479,491 A | 12/1995 | Herrero Garcia et al. |
| 5,538,255 A | 7/1996 | Barker |
| 5,553,120 A | 9/1996 | Katz |
| 5,618,045 A | 4/1997 | Kagan et al. |
| 5,624,316 A | 4/1997 | Roskowski et al. |
| 5,632,681 A | 5/1997 | Bakoglu et al. |
| 5,646,629 A | 7/1997 | Loomis et al. |
| 5,685,775 A | 11/1997 | Bakoglu et al. |
| 5,701,580 A | 12/1997 | Yamane et al. |
| 5,702,305 A | 12/1997 | Norman et al. |
| 5,771,438 A | 6/1998 | Palermo et al. |
| 5,791,992 A | 8/1998 | Crump et al. |
| 5,799,240 A | 8/1998 | Miyashita |
| 5,809,520 A | 9/1998 | Edwards et al. |
| 5,870,465 A | 2/1999 | Hosbach et al. |
| 5,890,152 A | 3/1999 | Rapaport et al. |
| 5,904,620 A | 5/1999 | Kujawa |
| 5,941,775 A | 8/1999 | Naka et al. |

(Continued)

FOREIGN PATENT DOCUMENTS

EP    0 868 032 A2    9/1998

(Continued)

OTHER PUBLICATIONS

"JBL Professional Sound System Design Reference Manual," (Jan. 1999).

(Continued)

*Primary Examiner*—Scott E Jones
(74) *Attorney, Agent, or Firm*—Nixon & Vanderhye PC

(57) ABSTRACT

The amplitude of a video game player's voice determines how far his or her message is carried to other players in the game. The range a message carries is based on the relative virtual proximity of avatars associated with said players within the virtual game environment.

4 Claims, 3 Drawing Sheets

U.S. PATENT DOCUMENTS

| | | | |
|---|---|---|---|
| 5,944,608 | A | 8/1999 | Reed et al. |
| 5,956,485 | A | 9/1999 | Perlman |
| 5,961,386 | A | 10/1999 | Sawaguchi |
| 5,970,418 | A | 10/1999 | Budd et al. |
| 5,971,855 | A | 10/1999 | Ng |
| 5,984,783 | A | 11/1999 | Kikuchi et al. |
| 5,987,386 | A | 11/1999 | Merchant |
| 6,018,766 | A | 1/2000 | Samule et al. |
| 6,023,729 | A | 2/2000 | Samuel et al. |
| 6,112,084 | A | 8/2000 | Sicher et al. |
| 6,117,013 | A | 9/2000 | Eiba |
| 6,134,590 | A | 10/2000 | Perlman |
| 6,152,824 | A | 11/2000 | Rothschild |
| 6,183,367 | B1 | 2/2001 | Kaji |
| 6,192,333 | B1 | 2/2001 | Pentheroudakis |
| 6,192,395 | B1 | 2/2001 | Lerner et al. |
| 6,219,045 | B1 | 4/2001 | Leahy et al. |
| 6,219,695 | B1 | 4/2001 | Guttag et al. |
| 6,241,612 | B1 | 6/2001 | Heredia |
| 6,243,373 | B1 | 6/2001 | Turock |
| 6,257,982 | B1 | 7/2001 | Rider et al. |
| 6,275,792 | B1 | 8/2001 | Lewis |
| 6,302,795 | B1 | 10/2001 | Ito |
| 6,306,039 | B1 | 10/2001 | Kaji et al. |
| 6,315,669 | B1 | 11/2001 | Okada et al. |
| 6,360,104 | B1 | 3/2002 | Budd et al. |
| 6,373,462 | B1 | 4/2002 | Pan et al. |
| 6,438,124 | B1 | 8/2002 | Wilkes et al. |
| 6,449,344 | B1 | 9/2002 | Goldfinger et al. |
| 6,487,583 | B1 | 11/2002 | Harvey et al. |
| 6,496,851 | B1 | 12/2002 | Morris et al. |
| 6,515,690 | B1 | 2/2003 | Back et al. |
| 6,519,629 | B2 | 2/2003 | Harvey et al. |
| 6,523,068 | B1 | 2/2003 | Beser et al. |
| 6,561,811 | B2 | 5/2003 | Rapoza et al. |
| 6,677,968 | B1 | 1/2004 | Appelman |
| 6,694,352 | B1 | 2/2004 | Omoigui |
| 6,755,743 | B1 | 6/2004 | Yamashita et al. |
| 6,807,562 | B1 | 10/2004 | Pennock et al. |
| 6,881,147 | B2 | 4/2005 | Naghi et al. |
| 6,905,414 | B2 | 6/2005 | Danieli et al. |
| 6,908,389 | B1 | 6/2005 | Puskala |
| 6,928,329 | B1 | 8/2005 | Giaimo et al. |
| 6,932,708 | B2 | 8/2005 | Yamashita et al. |
| 6,935,959 | B2 | 8/2005 | Danieli et al. |
| 6,987,514 | B1 | 1/2006 | Beresin et al. |
| 2001/0016519 | A1 | 8/2001 | Choe |
| 2002/0165024 | A1 | 11/2002 | Puskala |
| 2002/0174248 | A1 | 11/2002 | Morriss |
| 2003/0080989 | A1 | 5/2003 | Matsuda et al. |
| 2003/0190960 | A1 | 10/2003 | Jokipii et al. |
| 2003/0216178 | A1 | 11/2003 | Danieli et al. |
| 2003/0216181 | A1 | 11/2003 | Danieli et al. |
| 2004/0109023 | A1* | 6/2004 | Tsuchiya .................... 345/758 |
| 2004/0152487 | A1 | 8/2004 | Peng |
| 2004/0198498 | A1 | 10/2004 | Yamashita et al. |
| 2005/0021159 | A1 | 1/2005 | Ogawa |
| 2005/0071481 | A1 | 3/2005 | Danieli |
| 2005/0113169 | A1 | 5/2005 | Danieli |
| 2005/0159833 | A1 | 7/2005 | Giaimo et al. |
| 2005/0169252 | A1 | 8/2005 | Riggs |
| 2005/0181815 | A1 | 8/2005 | Shostak |
| 2005/0181878 | A1 | 8/2005 | Danieli et al. |
| 2005/0245317 | A1 | 11/2005 | Arthur et al. |
| 2006/0015560 | A1 | 1/2006 | MacAuley et al. |

FOREIGN PATENT DOCUMENTS

| | | |
|---|---|---|
| GB | 2287474 | 9/1995 |
| GB | 2331195 A | 9/2000 |
| JP | 7-088253 | 4/1995 |
| JP | 10-076071 | 3/1998 |
| JP | 10-192483 | 7/1998 |
| JP | 11-088508 | 3/1999 |
| JP | 11-137851 | 5/1999 |
| JP | 11-271420 | 10/1999 |

OTHER PUBLICATIONS

Pinkfish, "File events.c," http://www.lost.nu/autodoc/global.events.c.html, 22 pages (Jun. 29, 2000).
Samuel, Dan, "Well of Souls Really Old Release Notes," http://www.synthetic-reality.com/wosReleaseOld.htm, 63 pages (1998-2000).
Getty, Jim W., "Xbox Live: Xbox Voice Communication," 3 pages (2004).
Product Information, "Xbox Live Starter Kit," 2 pages (2004).
"Xbox Live Instruction Manual," (2003).
"Xbox Communicator," Instruction Manual (2003).
"Game Commander vs. Voice," http://www.gamecommander.com/products/gcvsgv.html, 5 pages, Mindmaker Inc. (copyright 1999-2003).
"Game Commander 3," http://www.gamecommander.com/products/gc3.html, 7 pages, Mindmaker Inc. (copyright 1999-2003).
"Game Commander 2 User's Guide," http://www.gamecommander.com/products/gcvsgv.html, 5 pages, Mindmaker Inc. (copyright 2001).
"Roger Wilco—Voice Chat for Games," http://rogerwilco.gamespy.com/, 2 pages (Jul. 8, 2003).
"Attention Teamspeak Users," http://www.teamspeak.org/, 4 pages (Oct. 6, 2004).
"Ventrilo—Scalable Voice Communication Software," http://www.ventriolo.com/, 1 page (1999).
"Thrustmaster Europe—Products," http://europe.thrustmaster.com/products/dsp_fam.php?fam=44, 2 pages (2002).
"Home Office Reports Review of Voice Recognition Software," http://homeofficereports.com/Voice%20Recognition%20Software.htm, 16 pages (Jun. 9, 2004).

* cited by examiner

VIDEO GAME VOICE CHAT WITH AMPLITUDE-BASED VIRTUAL RANGING

CROSS-REFERENCES TO RELATED APPLICATIONS

This case is related to commonly assigned copending patent application Ser. No. 10/901,452, entitled "Voice-To-Text Conversion For Remote Video Game Play", incorporated herein by reference.

STATEMENT REGARDING FEDERALLY SPONSORED RESEARCH OR DEVELOPMENT

Not applicable.

FIELD

The technology herein relates to remote or networked video game play, and more particularly to networked video game play wherein remote users can communicate with one another via chat capabilities. In still more detail, the technology herein relates to method and apparatus providing remote video game play wherein a player's speech is converted into text and formatted for textual display or other indication at a remote player site.

BACKGROUND AND SUMMARY

Networked or remote video game play has become increasingly popular. For several years now, game players using personal computers have played Doom, Quake and other multiplayer networked games over the Internet. Such multiplayer games can involve a number of different game players from all over the country or the world. One especially interesting genre of remote video games uses a team approach where the various players align themselves in teams and work together to accomplish a particular objective (defeat another team, beat another team in locating a treasure or fulfilling some other quest, etc.).

It is useful in such video game play contexts to allow the various game players to communicate with one another during game play. For example, members of the same team may wish to strategize so they can work together more effectively. Sometimes, players on opposite sides of a challenge may need to communicate information or otherwise coordinate their game play. Additionally, adding an inter-player communications capability may raise the fun factor substantially. Rather than simply sitting alone in front of a computer or television set moving a game character on a screen, the game play experience becomes much more interactive and personal when one is communicating with a group of friends or acquaintances.

While some game players are known to talk together on the telephone at the same time as they are involved in remote game play, many in the gaming industry have sought to provide a chat capability as a part of or adjunct to video game software. Early approaches, especially on PC games, provided a text chat capability allowing players to send text messages to one another. A player would use the keyboard to type in an instant message which could then be sent over the same communications medium carrying interactive game play information back and forth. Such text messages could be replied to by other players to provide interactive text "chat" communications. The effectiveness of such text chat capabilities depended on the type of game. For a relatively slow-moving long term adventure game, text chat could be quite effective in allowing players to coordinate their activities while at the same time communicating other fun and interesting information about themselves.

It has been known in the past to simulate certain real-world voice characteristics using text chat. For example, certain role playing games give players the option of qualifying their text chat with either a "whisper" command or a "shout" command. Under normal conditions, all human players receive all chats. In some games, avatars and associated human players outside of the neighborhood of the avatar making the chat declaration will not receive the chat. Qualifying the text chat declaration with a "shout" command allows all avatars to receive the chat text. Qualifying the chat declaration with a "whisper" command restricts distribution of the chat declaration to only a single specified avatar and associated human player.

To take advantage of the relatively higher communications bandwidths now available to most gamers via DSL, cable or other communications means, several software developers and game companies have developed voice chat capabilities for use in remote video game play. To use voice chat, the game players typically put on headsets that include both earphones and a microphone. Software and hardware within the personal computer or gaming platform digitizes voice picked up by the microphone and transmits the resulting digital information to other game players. At the remote side, received digitized speech signals are converted back into audio, amplified and played back through remote game player's headsets. Such voice chat eliminates the need for game players to use a keyboard while providing nearly instantaneous inter-player communications and coordination.

While much work has been done in this area in the past, further improvements are possible and desirable.

In one example illustrative non-limiting implementation, the amplitude of a game player's voice determines how far the game player's chat message is carried to other players in the virtual game environment. The other players either hear the message originator's actual voice (via voice chat) or see a text translation of the speech. For example, if a game player speaks at a normal volume level, those players and characters within a certain virtual distance range within the game environment will be able to see/hear what the player is saying. If the player shouts, players and characters further away can also hear/see. If the player whispers, only the players and characters within a smaller virtual distance range can see/hear.

In accordance with a further illustrative non-limiting example implementation, the game player can obtain power-ups in a game that extends the distance of speech (e.g., a megaphone, a microphone, an amplifier, etc.). Similarly, power-ups in the game can be used to encode speech—only those with the appropriate decoder can understand what the player is saying, though others might be able to hear/see that something was being said. The virtual distance can be determined by a physical analysis of the environment around a game character—e.g., in-game geometry, material properties, ambient temperature, ambient noise and other virtual environmental affects can be taken into consideration in determining the path and reach of the message. For example in a very noisy virtual environment, the game player may need to shout in order to have his or her message seen/heard.

In another non-limiting example implementation, the game player does not manually select which other player or players can or can't hear his or her speech. Just like in real life, any virtual game characters within certain virtual distance range (within the game) of the human player's character or avatar will be able to hear the speech. Players may attempt to control the audience for the message by varying the volume and direction of their voice. Even if player A whispers to player B who is standing right next to player A, other players may still be able to hear what player A is saying, and player A might not necessarily know this fact (again, just like real life). Player C might be able to hear what player A is saying if he or she is close enough to player B and if player A's speech amplitude is high enough to have not attenuated to an inaudible level by the time it travels the in-game distance from player A to player C. In another exemplary illustrative non-limiting implementation, the game environment may be able to provide visual cues showing the speaker how far his or her voice is traveling. For example, concentric circles on the ground or other virtual surface in an overlaid fashion could be used. This would provide a good cue for the speaker to determine if a given player that is visible on-screen can hear what the player is saying.

BRIEF DESCRIPTION OF THE DRAWINGS

These and other features and advantages will be better and more completely understood by referring to the following detailed description in conjunction with the drawings of which:

FIG. 3 is a flowchart of an example illustrative non-limiting amplitude detection and virtual range setting.

DETAILED DESCRIPTION

Figure 1:
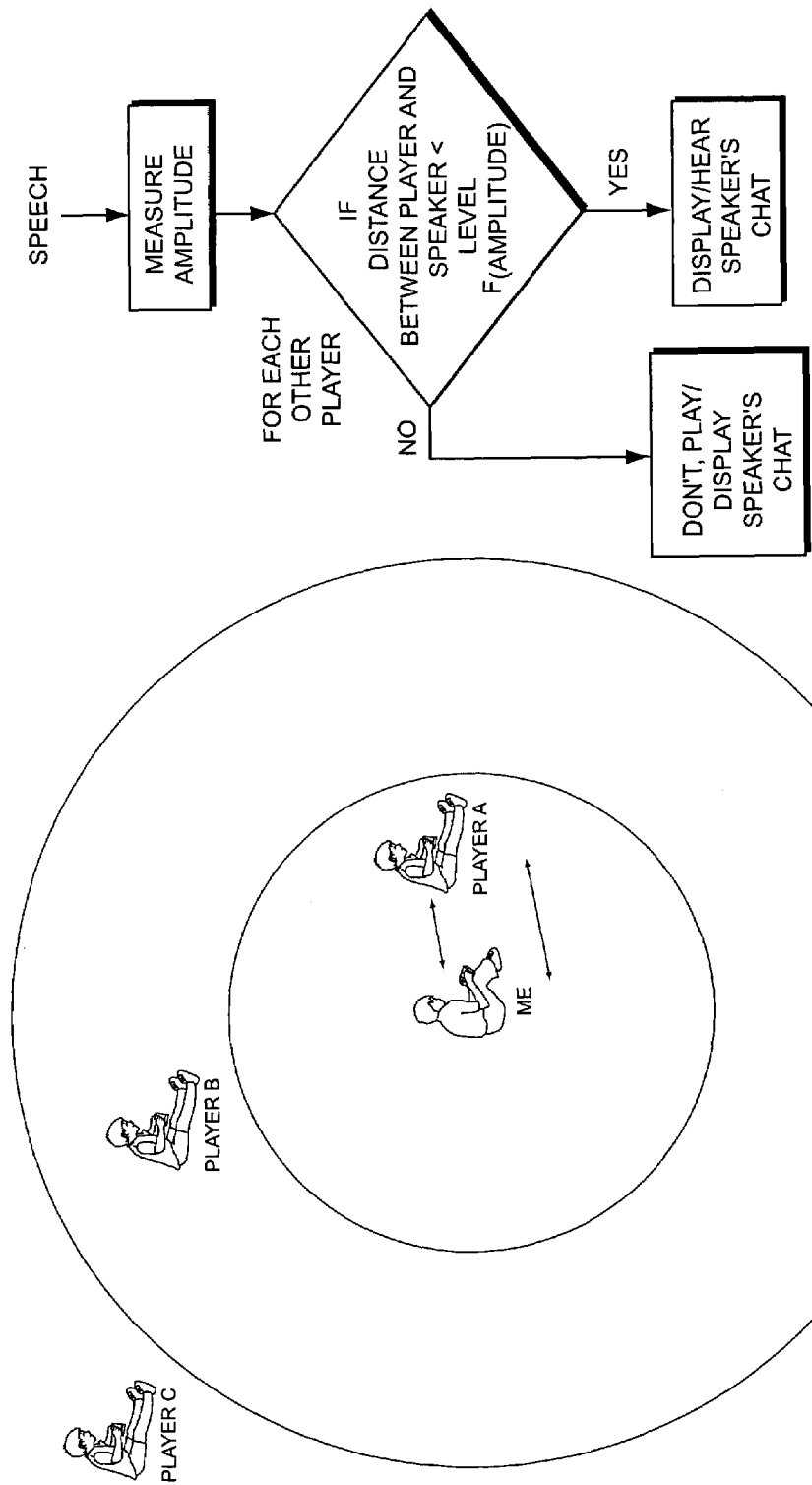
FIG. 1 shows an example illustrative non-limiting schematic illustration of virtual distance ranging based on detected speech amplitude.

FIG. 1 shows an example schematic implementation of an illustrative non-limiting exemplary virtual distance ranging chat system for video games and other applications. In the example shown, an avatar labeled "me" speaks into a microphone to provide voice chat. An amplitude detector automatically detects how loud the human player is speaking. If the human player controlling the "me" avatar is speaking at a low amplitude (e.g., a whisper), then only those human players (player A) whose avatars are within a limited virtual range within the game will be able to hear or see the chat. This is indicated by the inner circle C1. If the "me" player speaks a bit louder, then the higher detected speech amplitude will allow the chat message to be carried to a further, more extensive virtual distance range within the game so that both player A and player B (but not player C) will be able to hear the message. This is indicated by the outer circle C2 shown in FIG. 1. If the "me" player speaks still louder (e.g., by shouting), the higher detected amplitude will allow the message to be carried outside of the C2 circle to each player C in addition to player B and player A.

The location of a human players' avatars within the game may for example have no relationship to physical locations of the human players who are controlling those avatars. For example, human players controlling avatars A and C could be in the same apartment building in Seattle whereas the human player controlling avatar B could be in Washington D.C. To game players immersed in the game, the in-game locations of their avatars, characters or other objects are quite real, so therefore exemplary illustrative non-limiting implementations of the technology herein use these "in-game" locations and distances for sound/text chat attenuation calculations.

Thus, in the illustrative example shown, the distances are the virtual distances of characters within a virtual 2D or 3D video game environment. For example, in the game, the "me" player and player A might be located within the same room, landscape, level or other virtual physical proximity to one another. Player B might be located in a different room, a different part of the landscape, on a different level, etc. Player C may be located in a still further virtual location such as in a different building, a different virtual location altogether, etc. The proximity calculations and analysis may in general depend on and be specific to the particular virtual game environment of the game.

Figure 2:
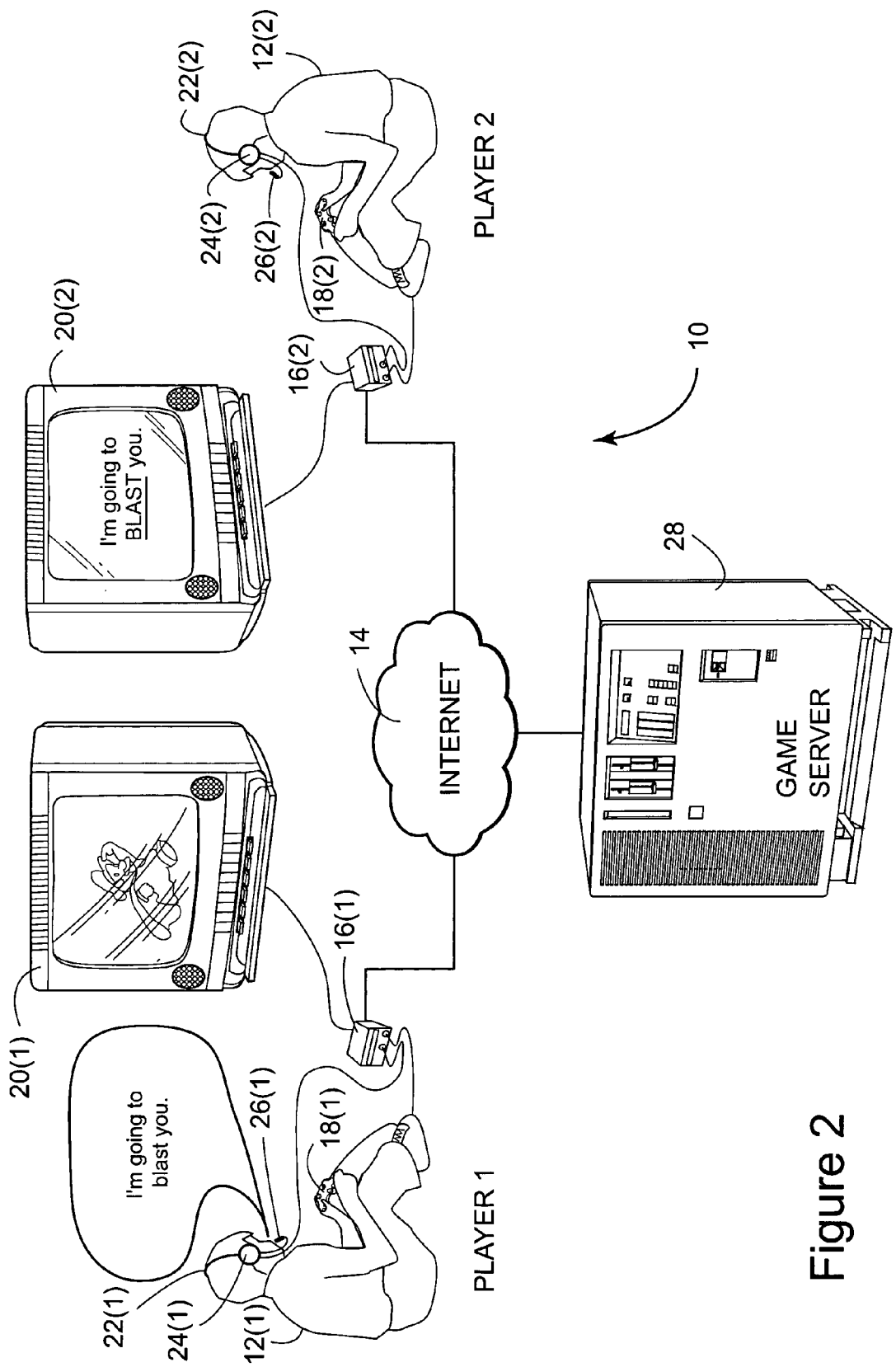
FIG. 2 shows an example illustrative non-limiting multi-player game system.
Figure 4:
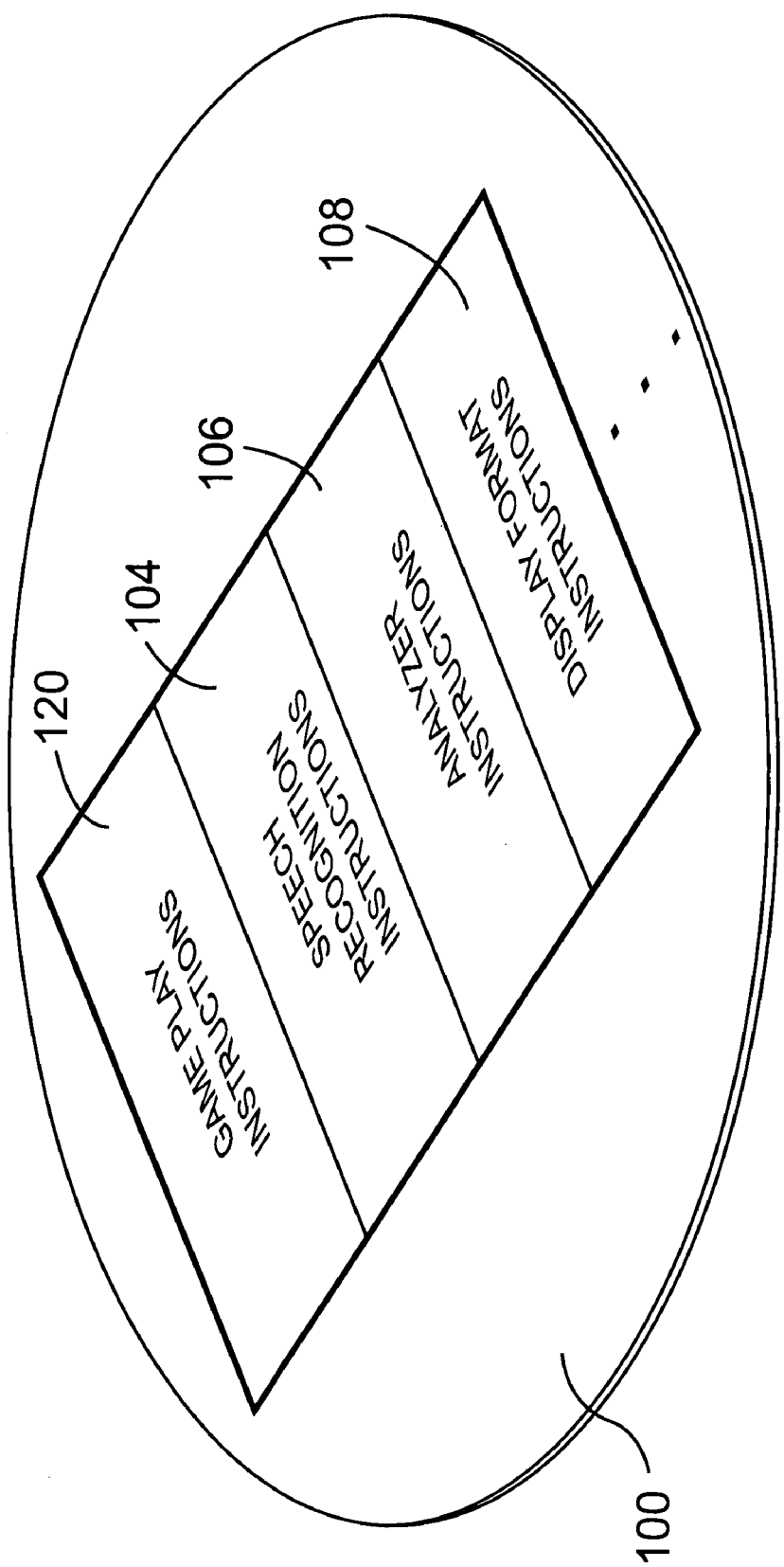
FIG. 4 shows an example illustrative non-limiting implementation of a program instruction storage medium.

FIG. 2 schematically shows an example non-limiting illustrative implementation of a multi-player gaming system 10. In the example implementation shown, video game player 12(1) plays a video game against another video game player 12(2) (any number of players can be involved).

In one example illustrative implementation, video game players 12(1) and 12(2) may be remotely located, with communications being provide between them via a network 14 such as the Internet or any other signal path capable of carrying game play data or other signals. In the example system 10 shown, each game player 12 has available to him or her electronic video game playing equipment 16. In the example shown, video game playing equipment 16 may comprise for example a home video game platform such as a NINTENDO GAMECUBE system connected to a handheld game controller 18 and a display device 20 such as a home color television set. In other examples, game playing equipment 16 could comprise a handheld networked video game platform such as a NINTENDO DS or GAMEBOY ADVANCE, a personal computer including a monitor and appropriate input device(s), a cellular telephone, a personal digital assistant, or any other electronic or other appliance.

In the example system 10 shown, each of players 12 has a headset 22 including earphones 24 and a microphone 26. Earphones 24 receive audio signals from game playing equipment 16 and play them back into the player 12's ears. Microphone 26 receives acoustical signals (e.g., speech spoken by a player 12) and provides associated audio signals to the game playing equipment 16. In other exemplary implementations, microphone 26 and earphones 24 could be separate devices or a loud speaker and appropriate feedback-canceling microphone could be used instead. In the example shown in FIG. 2, both of players 12(1) and 12(2) are equipped with a headset 22, but depending upon the context it may be that only some subset of the players have such equipment.

In the example system 10 shown, each of players 12 interacts with video game play by inputting commands via a handheld controller 18 and watching a resulting display (which may be audio visual) on a display device 20. Software and/or hardware provided by game playing platforms 16 produce interactive 2D or 3D video game play and associated sound. In the example shown, each instance of game playing equipment 16 provides appropriate functionality to produce local video game play while communicating sufficient coordination signals for other instances of the game playing equipment to allow all players 12 to participate in the "same" game.

Generally, in one exemplary illustrative non-limiting implementation, each human player is represented by an avatar or game character. For example, in a "dungeons and dragons" type role playing game, one player could be represented by a wizard avatar (i.e., a character who has the appearance and characteristics of a wizard), another player might be represented by a knight avatar, yet another player might be represented by an elf character, etc. In a sports game, one player might be represented by a basketball player on a first team, and another player might be represented by a basketball player on another team. Generally, the human player controls his or her avatar by operating a handheld game controller 18. In some contexts, the video game could be a multiplayer first person shooter, driving, sports or any other genre of video game wherein each of players 12 can manipulate an associated character or other display object by inputting commands via handheld controllers 18. For example, in a sports game, one player 12(1) could control the players of one team, while another player 12(2) could control the players on an opposite team. In a driving game, each of players 12(1), 12(2) could control a respective car or other vehicle. In a flight or space simulation game, each of players 12 may control a respective aircraft. In a multi-user role playing game, each of players may control a respective avatar that interacts with other avatars within the virtual environment provided by the game. Any number of players may be involved depending upon the particular game play.

As will be seen in FIG. 2, a game server 28 may optionally be provided to coordinate game play. For example, in the case of a complex multiplayer role playing game having tens or even hundreds of players 12 who can play simultaneously, a game server 28 may be used to keep track of the master game playing database and to provide updates to each instance of game playing equipment 16. In other game playing contexts, a game server 28 may not be necessary with all coordination being provided directly between the various instances of game playing equipment 16.

In the particular example system 10 shown in FIG. 2, a voice-to-voice text chat capability is provided. As can be seen, player 12(1) in this particular example is speaking the following words into his or her microphone 26:

"I'm going to blast you."

In response to this statement, game playing equipment 16 and/or game server 28 converts the spoken utterance into data representing associated text. The text can be used by itself or in conjunction with the digitized voice to provide a text chat or text-and-voice chat. In another exemplary illustrative implementation, only voice chat is provided and the speech-to-text conversion is not used.

FIG. 3 shows an example illustrative non-limiting flowchart. In the example shown, speech uttered by one of the players is analyzed and its amplitude is determined. In one illustrative exemplary non-limiting implementation, the amplitude detection is performed by using an analog-to-digital converter to convert the speech (which may be inputted via a microphone) into a digital signal, and the amplitude of the resulting digital signal may be measured and averaged. The measured amplitude is then tested to determine if the distance between the speaking player and an additional speaker is less than a level function which is a function of the amplitude. If the distance is below this calculated value, then the speech is passed to the human player that is controlling player C, e.g., by providing a streaming voice chat audio signal to that human player and/or by displaying a voice-to-text conversion of the message to that player. If the virtual distance between the speaking player and the other player in question is not less than the calculated level, then the message is not passed or provided to that other player.

More complex, dynamic ranging calculations based on actual in-game distances as compared with a logarithmic or other functions modeling the attenuation of sound in various media (air, water, etc.) could be used. Factors that could be taken into account in determining virtual chat range could include for example:

ambient sound level within game environment
ambient acoustical reflection, diffraction and/or absorption within game environment
temperature gradients within game environment
wind velocity within game environment
humidity within game environment
proximity to virtual water surface within game environment (sound carries longer distances over water)
sound pitch
echoes and reverberation within game environment
characteristics of avatars (e.g., dog avatars may have more sensitive hearing than human avatars, and wizard or other magical avatars may hear more than non-magical avatars)
direction speaking avatar is facing when speaking
availability of any "power up" capabilities to speaking avatar (e.g., virtual megaphone, virtual amplified microphone, virtual radio communications devices, virtual telepathy, etc.)

See for example Ballou, Handbook for Sound Engineers (3d Ed. Focal Press) and JBL Sound System Design Reference Manual for various physical sound propagation behaviors that can be modeled in the context of a video game and the technology herein. Further, such sound attenuation modeling functions could be used to distort or otherwise render messages only partially intelligible just like in real life.

Note that in a multi-player game environment, the process shown in FIG. 3 may be performed for each of the various characters or avatars based upon their own virtual distance within the gaming environment from the player who is speaking. In one exemplary illustrative non-limiting implementation, software associated with every player calculates the sound function and makes the comparison whenever any other player is speaking. In the example shown, the level is a function of the amplitude but of course other calculations (e.g., fixed thresholds, etc.) could be used instead. The calculation, as mentioned above, could in some implementations take into account additional factors of the virtual game environment such as for example, obstructions between the players such as walls or floors, ambient game noise, or any other desired factor.

While the description above refers to virtual distance within a game environment, it would be possible to use actual physical distance between human communicators. For example, if the communications platforms were cellular, it would be possible using GPS or other technology to calculate how much distance lies between the different users' physical locations.

Each of the publications mentioned above are incorporated herein by reference.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

I claim:
1. A video game system comprising:
an audio transducer that receives acoustical information including speech;
an amplitude detector that detects the amplitude of said received acoustical information; and
a messaging arrangement that selectively messages other players of said video game as a function of (a) said received acoustical information, (b) said detected ampli- tude, and (c) the respective relative virtual proximity of avatars within said video game that represent said players.

2. A video game playing method comprising:

receiving acoustical information including speech;

detecting the amplitude of said received acoustical information; and selectively messaging other players of said video game as a function of (a) said received acoustical information, (b) said detected amplitude, and (c) the respective relative virtual proximity of avatars within said video game representing said players.

3. A multiplayer video game play system comprising:

means for receiving acoustical information including speech;

means for detecting the amplitude of said received acoustical information; and means for selectively messaging other players of said video game as a function of (a) said received acoustical information, (b) said detected amplitude, and (c) the respective relative virtual proximity of avatars within said video game representing said players.

4. A storage medium comprising:

a first storage area that stores instructions for receiving acoustical information including speech;

a second storage area that stores instructions for detecting the amplitude of said received acoustical information; and a third storage area that stores instructions for selectively messaging other players of said video game as a function of (a) said received acoustical information, (b) said detected amplitude, and (c) the respective relative virtual proximity of avatars within said video game representing said players.

* * * * *